(12) United States Patent
Shuklla et al.

(10) Patent No.: US 8,192,618 B1
(45) Date of Patent: Jun. 5, 2012

(54) ULTRASONIC DIALYZER

(76) Inventors: Ashok Kumar Shuklla, Ellicott City, MD (US); Mukta Misra Shukla, Ellicott City, MD (US); Kavita M. Shukla, Ellicott City, MD (US)

( * ) Notice: Subject to any disclaimer, the term of this patent is extended or adjusted under 35 U.S.C. 154(b) by 387 days.

(21) Appl. No.: 12/583,705

(22) Filed: Aug. 25, 2009

Related U.S. Application Data

(60) Provisional application No. 61/189,860, filed on Aug. 25, 2008.

(51) Int. Cl.
*B01D 17/09* (2006.01)

(52) U.S. Cl. ..... 210/175; 210/180; 210/192; 210/198.2; 210/209; 210/263; 210/321.6; 210/321.78; 210/321.79; 210/321.87; 210/321.88; 96/175; 219/687; 250/281; 250/432 R; 422/70; 422/534; 422/535

(58) Field of Classification Search ................ 210/635, 210/638, 645–647, 650, 656, 663, 669, 806, 210/785, 85, 86, 198.2, 259, 263, 266, 321.6, 210/321.72, 321.78, 321.87, 175, 180, 192, 210/209, 502.1; 435/287.1, 287.2, 287.7, 435/287.8, 288.1, 288.6; 422/68.1, 69, 70, 422/527, 534, 535; 250/281, 288, 428, 432 R; 96/175, 188, 218; 219/687, 688; 392/386, 392/394, 396, 399
See application file for complete search history.

(56) References Cited

U.S. PATENT DOCUMENTS

| 5,245,185 A * | 9/1993 | Busch et al. ............... 250/288 |
| 7,347,889 B2 * | 3/2008 | Matsuura et al. .............. 96/389 |
| 7,413,596 B2 * | 8/2008 | Platow et al. .................. 95/266 |
| 2007/0138095 A1 * | 6/2007 | Purdum ...................... 210/647 |

* cited by examiner

*Primary Examiner* — Joseph Drodge

(57) ABSTRACT

In the present invention, dialysis tubing is placed in a chamber, where an ultrasonic or a other mist producer is present. The ultrasonic mist producer will produce mist and small water droplets will be attached to the surface of dialysis membrane (sheet or tubing) and will condense and the water drops will fall back in the solution tank, where the ultrasonic probe produces the mist. When the droplet is attached to the membrane surface, the dialysis will take place.

10 Claims, 7 Drawing Sheets

ULTRASONIC DIALYZER

This application (Applicants) claims the benefit of priority dated Aug. 25, 2008 of provisional application No. 61/189,860

FIELD OF THE INVENTION

In the present invention, we describe a device for small sample dialysis using an ultrasonic or mist producing device for the concentration and dialysis of samples. Dialysis tubing is placed in a chamber, where an ultrasonic or other mist producer is present. The ultrasonic mist producer will produce mist and small water droplets will be attached to the surface of dialysis membrane (sheet or tubing) and will condense and then will fall back in the solution tank, where the ultrasonic probe produces the mist. When the droplet is attached to the membrane surface, the dialysis will take place. By using the ultrasound mist producer, the quantity of water needed for dialysis will be reduced. Furthermore; if the dialysate needs to be concentrated, it will also concentrate in the chamber, where the ultrasonic probe is present. This can be enhanced by using the adsorption of dialyzed molecule on particles such as chromatographic particles. This device can be used for small samples of few micro liters as well as for larger sample prep of thousands of liters to produce drinking water.

BACKGROUND OF THE INVENTION

Definitions

Dialysis Chamber: is a solid chamber, which contains a sample in a solution, and dialysis membrane.
Membrane: are semi-permeable membranes which are capable of passing molecules which are smaller then the pore in the membranes. The said membrane could be either sheet or tube form.
Dialysate: is the solution which contains the small molecules, which pass through the dialysis tubing pore into the outside solution. The molecules which are passing through the tubing are soluble in the sample solution, as well as in the dialysate.
Sample: is a solution which contains different molecular weight molecules, ions etc.
Sample (analytes): means any sample from a chemical or biological source and the sample may contain several molecules. Sample preparation means the purification and separation of different molecules in the sample.
Solvent: means organic and inorganic solvents including water, buffers, solutions.
Solute: means a liquid, solid or semi-solid dissolved in the solvent.

BACKGROUND

Small sample preparation is typically performed to concentrate and/or clean up samples by removing impurities such as detergent, salt or other molecules, prior to performing sample analysis using different analytical tools such as, HPLC, Mass spectrometry, electrophoresis.

Dialysis is very commonly used in the biochemistry lab for the de-salting or removal of small molecules from a sample solution. Different molecular Cut Off's (MWCO) are commercially available to separate a particular cut of molecular weight biomolecules.

In a routine dialysis procedure, the dialysis tubing is placed in a container with water or buffer, against which the dialysis is performed. The container of water or buffer should be much larger (10-100 times the sample inside the tubing) than the sample volume for efficient dialysis. Furthermore, the water should be changed from time to time for more efficient dialysis.

The present invention describes a system using dialysis membrane and a mist producer for small sample preparation, concentration, as well as, separation of different components comprising a sample. The device described here does not need large amount of water to perform the dialysis. Furthermore, the dialysate is simultaneously concentrated during the dialysis with molecules, which are dialyzed through the dialysis tube. This will save pure water, time and energy used to concentrate the dialyzed molecule.

The various features of novelty, which characterize the present invention, are pointed out with particularity in the claims annexed to and forming a part of this disclosure. For a better understanding of the invention, its advantages and objects, reference is made to the accompanying drawings and descriptive matter in which a preferred embodiment of the invention is illustrated.

BRIEF DESCRIPTION OF THE DRAWINGS

The foregoing and still other objects of this invention will become apparent, along with various advantages and features of novelty residing in the present embodiments, from study of the following drawing, in which.

DESCRIPTION OF THE PREFERRED EMBODIMENTS

Figure 1:
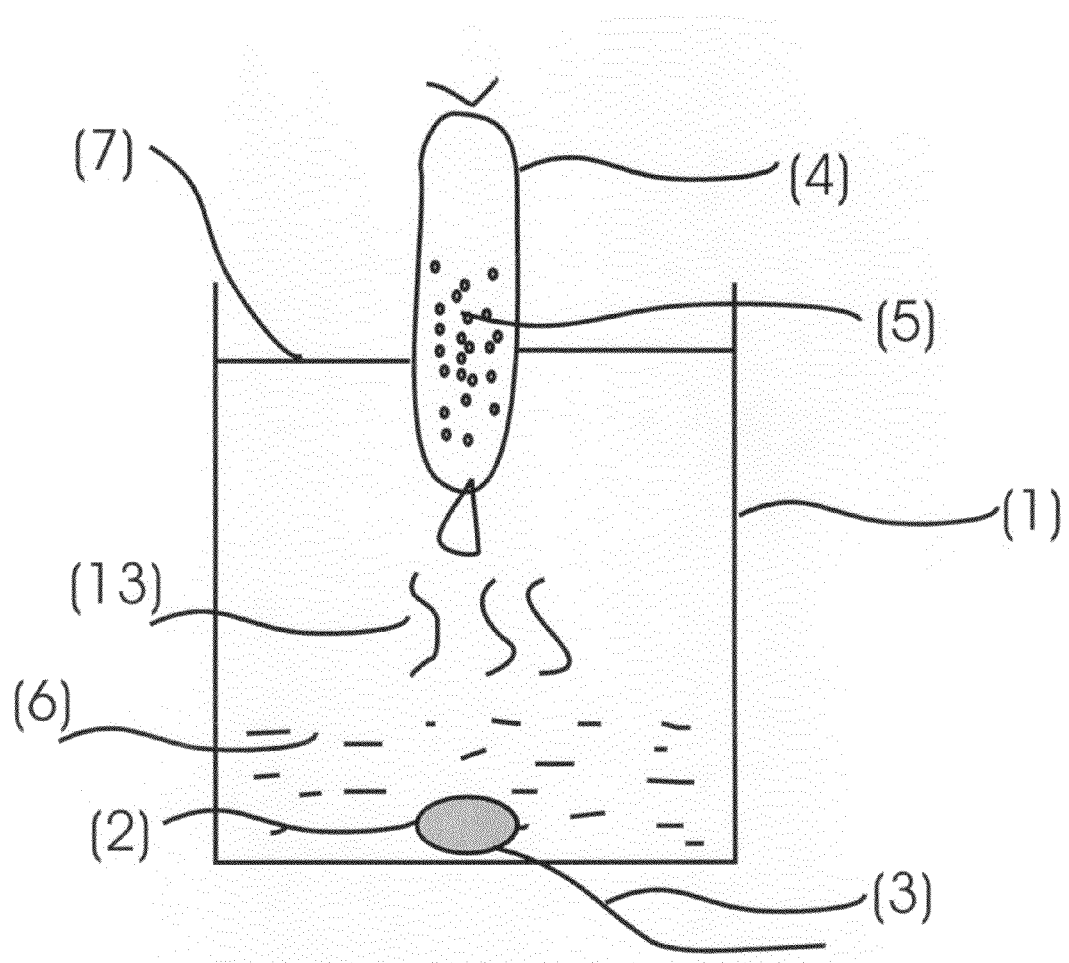
FIG. 1 is an expanded view of one embodiment of an ultrasonic dialyzer containing ultrasonic probe and dialysis tubing.

Referring to the drawings, FIG. 1 shows a container (1) containing water (6) or a solution (6) and an ultrasonic probe (2) with electrical wire (3) or portable, which create the mist (13). Furthermore, it contains the semi-permeable membrane (dialysis tubing) (4) containing sample solution (5), the said dialysis tubing is not immersed in the solution (6). The dialysis tubing may or may not touch the surface of the fluid (6).

A lid (7) may be optional to cover the container (1) so that the mist does not evaporate outside the container.

Figure 2:
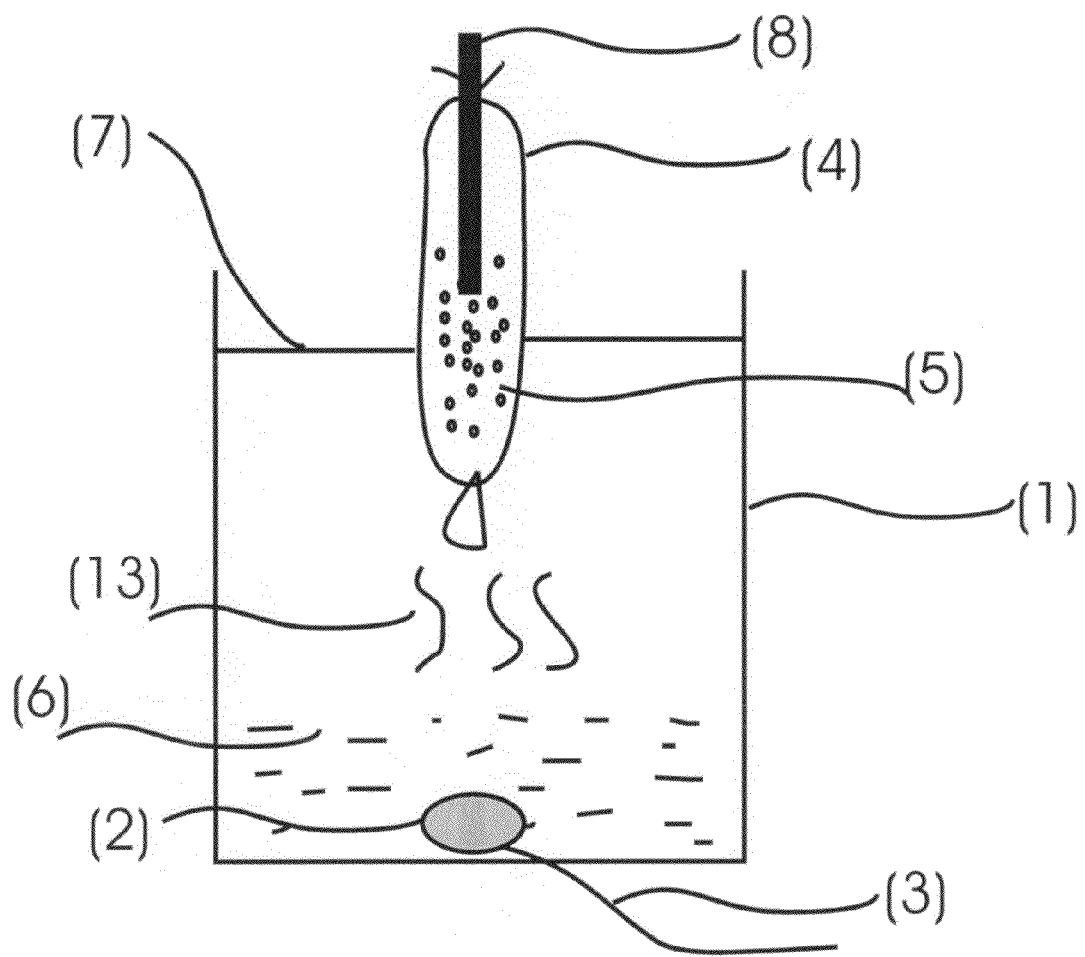
FIG. 2 is an expanded view of one embodiment of ultrasonic dialyzer, wherein a cooling rod is inside the dialysis tubing.
Figure 3:
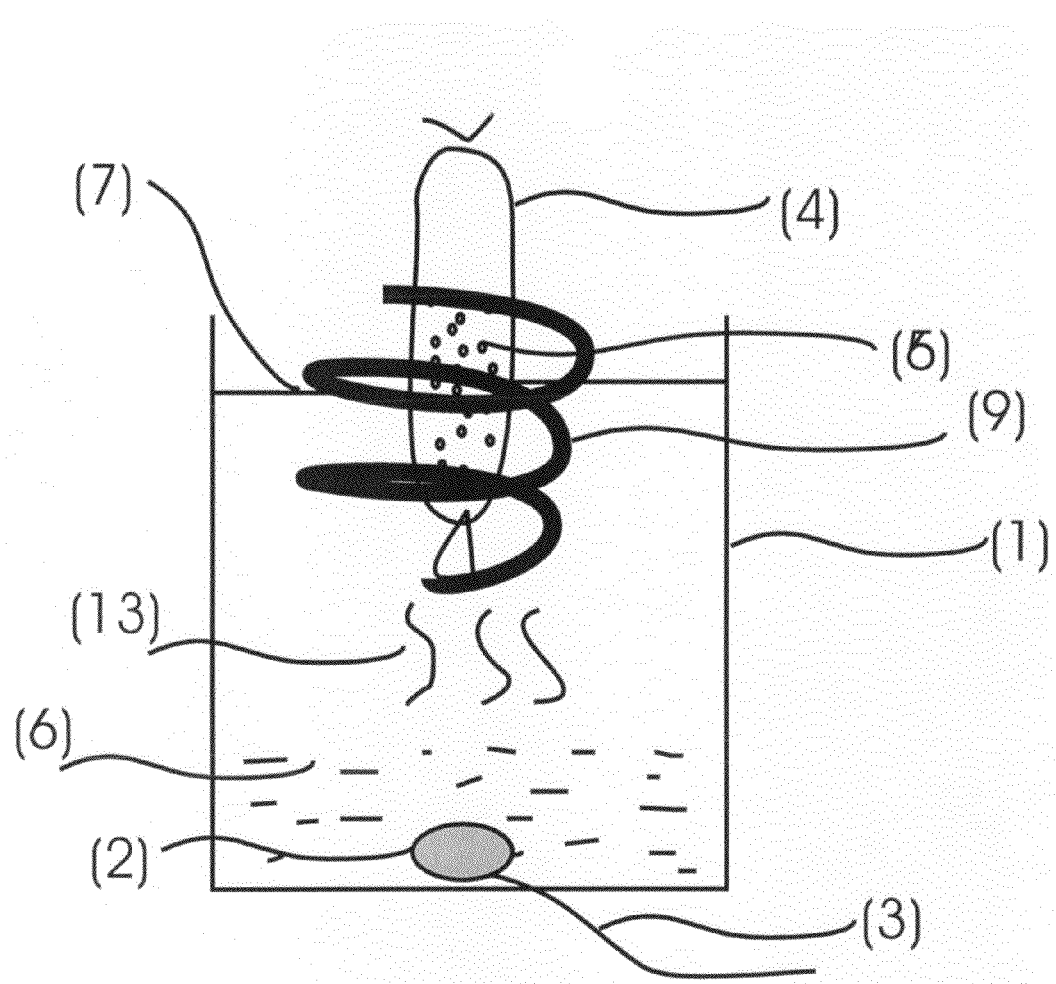
FIG. 3 is an expanded view of one embodiment of ultrasonic dialyzer, wherein a cooling rod or coil is outside the dialysis tubing.
Figure 6:
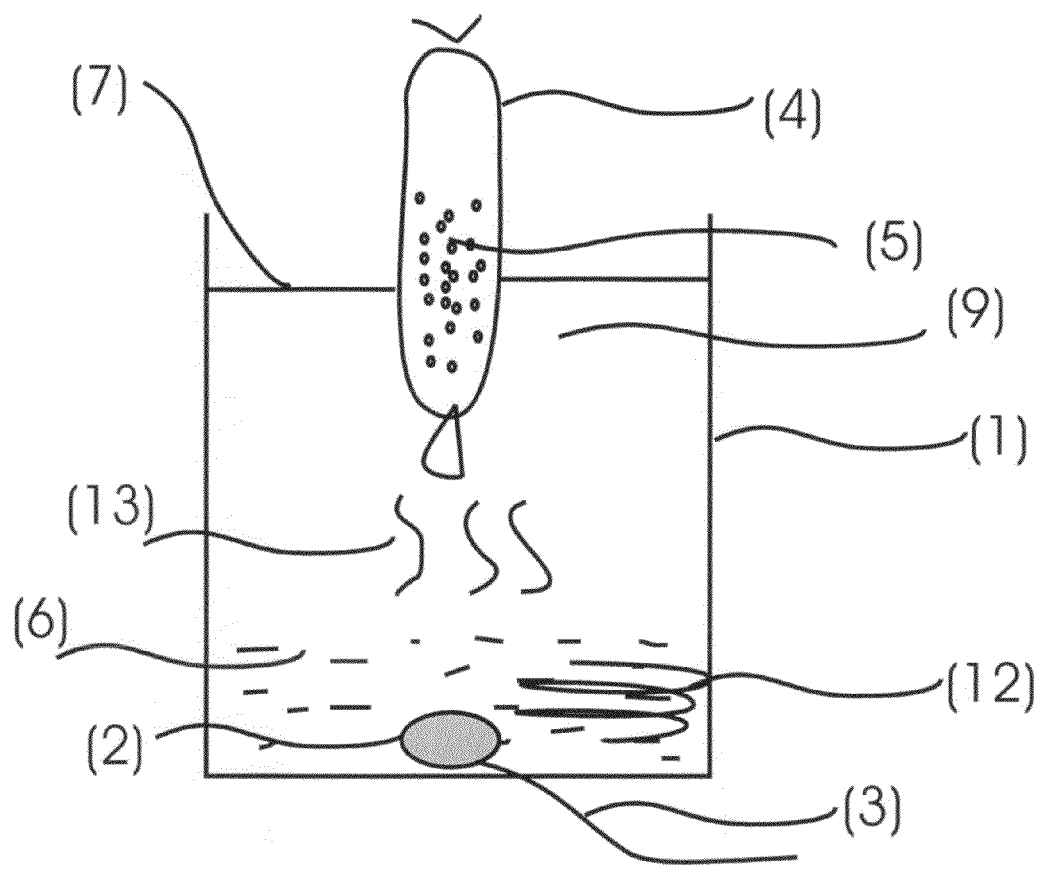
FIG. 6 is an expanded view of one embodiment of ultrasonic dialyzer, wherein a cooling rod or coil is in the mist producing solution.

Sometimes, the ultrasonic probe produces the heat and the mist can be warm, the heat may raise the temperature of the dialysis tubing (4) and this may sometimes not be suitable for the sample (heat sensitive sample) (5) in the dialysis tubing (4). Therefore, as shown in FIG. 2, a cooling probe (8) can be attached inside the tubing or as in FIG. 3, outside the tubing (9). The cooling probe (12) may be present in the solution (6) as in FIG. 6.

Figure 4:
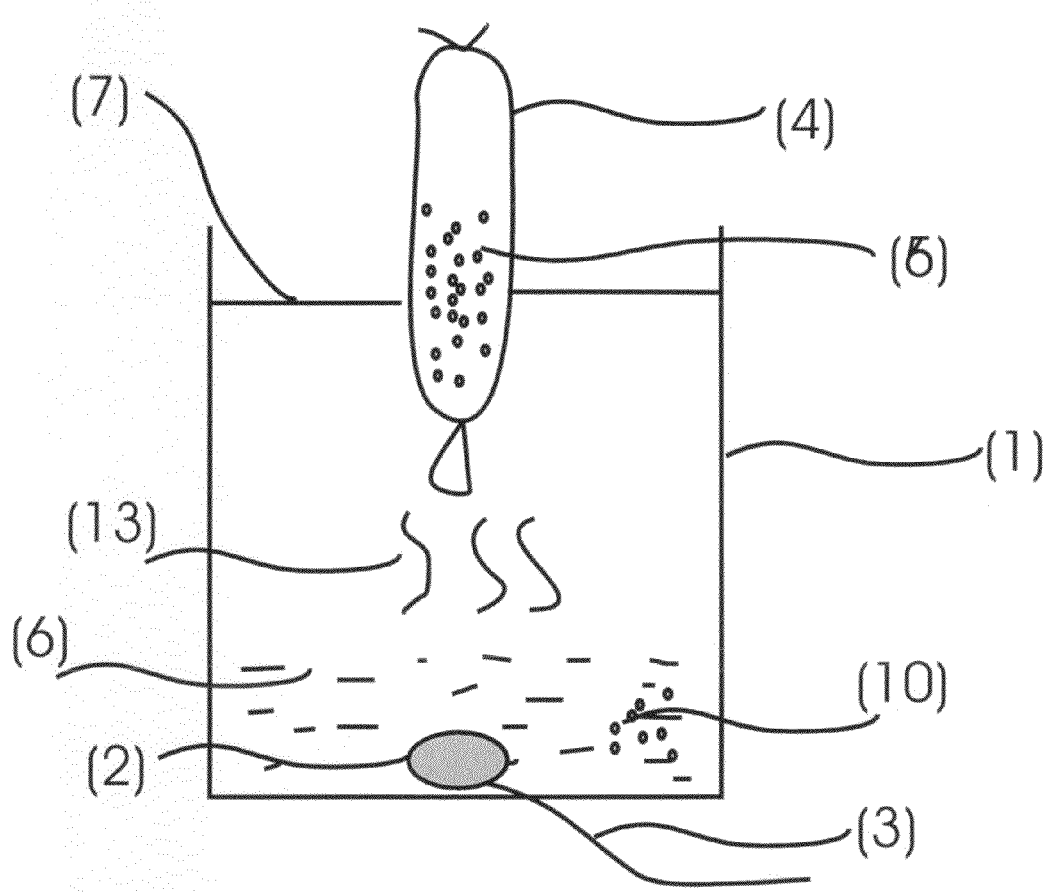
FIG. 4 is an expanded view of one embodiment of ultrasonic dialyzer, wherein non soluble particles are present to absorb or adsorb dialysate.
Figure 5:
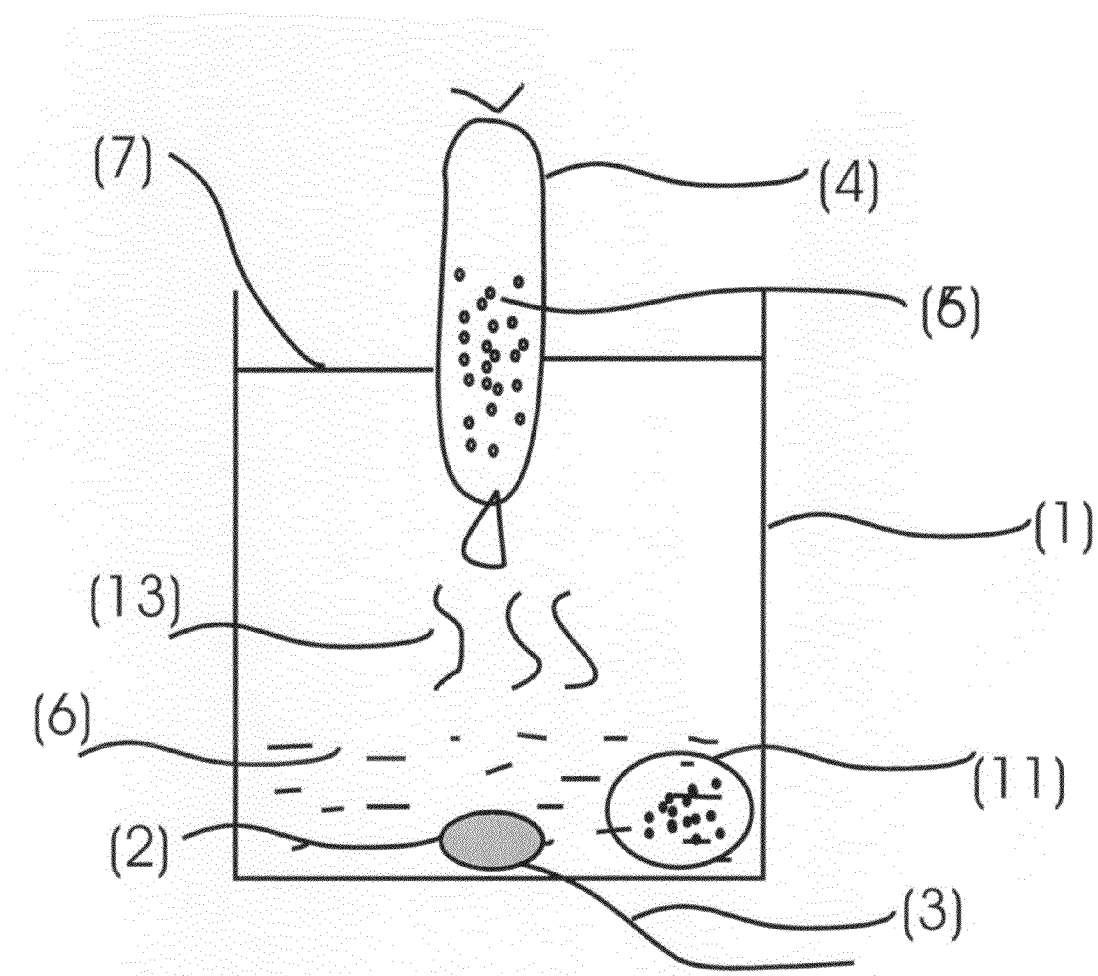
FIG. 5 is an expanded view of one embodiment of ultrasonic dialyzer, wherein non soluble particles are present in a bag, which allows the solution to go in and out but not the said particles, to absorb dialysate.

The buffer or water in the container may optionally contain the particles (10), which bind the molecules which are present in the solution (6) after dialysis. The particles can be present in loose form (10) FIG. 4. or in a pouch (11) (FIG. 5). The pouch (11) contains the pores, which allow the liquid (6) to go in and out, but not the particles.

The particles (10) can be chromatographic particles of any type and shape that can absorb the molecules which are present in the solution after dialysis. The said particles are selected from the group consisting of porous or non-porous bead; spherical or non spherical particles or broken fragments of silica; metal; affinity; polymer; titanium; gels; bacteria; living cells; zirconium; metal and non metal oxides; and their compounds and derivatives for the purpose of adsorption; and, combinations thereof. More then one type of particles can be used during the concentration of dialyzed molecules.

Figure 7:
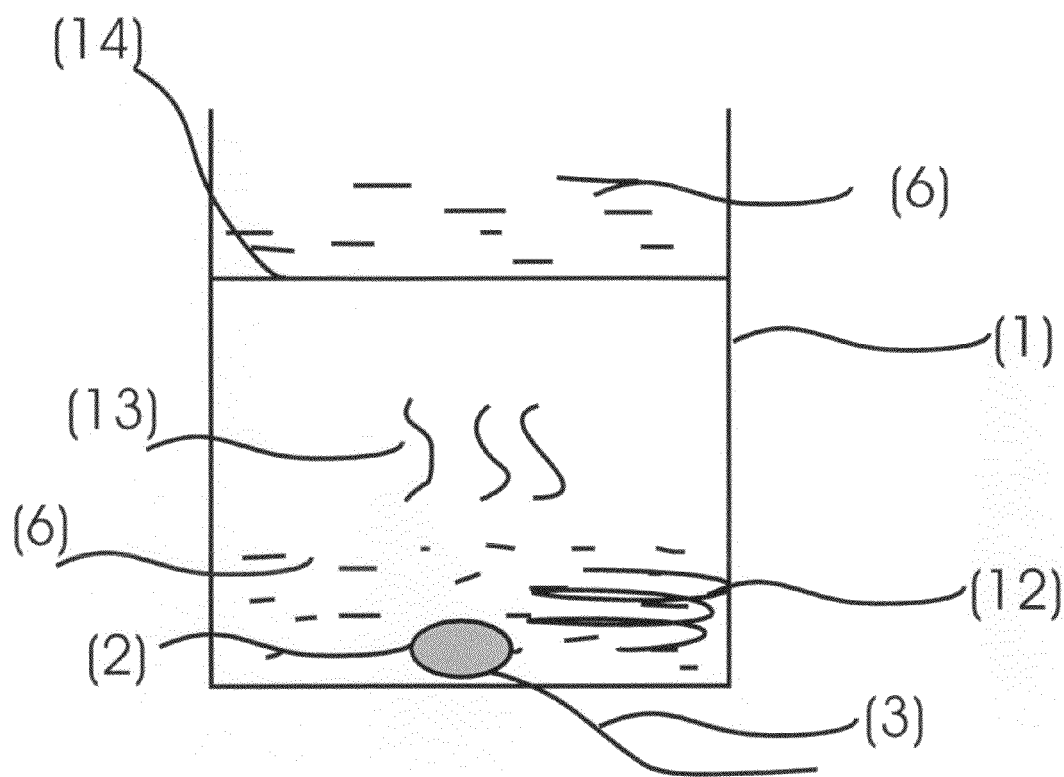
FIG. 7 is an expanded view of one embodiment of an ultrasonic dialyzer containing ultra sonic probe and dialysis membrane.

The FIG. 7 shows the membrane (14) in place of dialysis tubing. The said membrane surface contains areas in multiple membrane configurations including but not limited to 2-unit, 8-unit, 48-unit, 96-unit, 384-unit or 1536-unit formats.

The said membrane surface is made of cellulose, modified cellulose or polymer. Furthermore, the said membrane surface molecular weight Cut Off's (MWCO) can be between 100 Daltons to several millions Daltons.

This new device can be used for sample preparation applications such as HPLC; mass spectrometry; MALDI; electrophoresis; qualitative and quantitative analytical methods.

This new device can be used when the sample preparation process is performed for applications from the group consisting of purification of proteins, peptides, DNA and other biomolecules, size-based separation of molecules, chemical properties based separation of sample components, physical properties based separation of sample components.

Example

A 10,000 Daltons dialysis tubing was used to dialyze a sample containing phosphate buffer and bovine serum albumin (BSA) (MW 65,000. After using the ultrasonic dialyzer, the content of the dialysis tubing was analyzed by High Performance Liquid Chromatography (HPLC) and compared with normal dialysis method. The phosphate buffer was removed from the dialysis tubing and only BSA was left in the dialysis tubing.

While a specific embodiment of the invention has been shown and described in detail to illustrate the application of the principles of the invention, it is understood that the invention may be embodied otherwise without departing from such principles and that various modifications, alternate constructions, and equivalents will occur to those skilled in the area given the benefit of this disclosure and the embodiment described herein, as defined by the appended claims.

What is claimed is:

1. A device for dialysis comprising a chamber containing a solution with dissolved sample molecules, a semi-permeable dialysis membrane, said membrane allowing dialysis of the sample molecules, which are smaller in size than the pore size of said membrane, and an ultrasonic mist-producing probe, operative to produce mist required for the dialysis of the sample, the membrane being positioned and configured in the chamber such that mist rising from the sample contacts the surface of the membrane.

2. A device as in claim 1, wherein the membrane is a type selected from the group consisting of flat sheet, tubular, cylindrical, and combinations thereof.

3. A device as in claim 2, wherein the membrane comprises a multiple membrane configuration.

4. A device as in claim 1, wherein the membrane is modified chemically, physically or biologically.

5. A device as in claim 1, wherein the chamber contains particles which can adsorb the dialyzed molecules after dialysis.

6. A device as in claim 5, wherein the particles are selected from the group consisting of: porous or non-porous bead, spherical, non-spherical, broken fragments of silica, affinity, polymer, titanium metal, gels, bacteria, living cells, zirconium metal, other metal, metal and non-metal oxides and compounds, derivatives and combinations thereof.

7. A device as in claim 1, wherein the size of the particles ranges from nanometers to micrometers.

8. A device as in claim 1, wherein the membrane comprises cellulose, modified cellulose or polymer.

9. A device as in claim 1, wherein the membrane has a molecular weight cutoff of between 100 Daltons to several million Daltons.

10. A device as in claim 1, wherein the chamber contains a plurality of ultrasonic probes.

\* \* \* \* \*